(12) United States Patent　　　　(10) Patent No.:　US 12,603,320 B2

Teng　　　　　　　　　　　　　　　　　(45) Date of Patent:　Apr. 14, 2026

(54) CELL MANUFACTURING DEVICE AND METHOD, BATTERY, AND POWER CONSUMING APPARATUS

(71) Applicant: JIANGSU CONTEMPORARY AMPEREX TECHNOLOGY LIMITED, Changzhou (CN)

(72) Inventor: Guopeng Teng, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 319 days.

(21) Appl. No.: 18/167,539

(22) Filed: Feb. 10, 2023

(65) Prior Publication Data

US 2023/0187681 A1　Jun. 15, 2023

Related U.S. Application Data

(63) Continuation of application No. PCT/CN2022/082761, filed on Mar. 24, 2022.

(30) Foreign Application Priority Data

Jun. 1, 2021　(CN) .......................... 202110610984.5

(51) Int. Cl.
　　*H01M 10/04*　　　(2006.01)
　　*H01M 10/0587*　　(2010.01)

(52) U.S. Cl.
　　CPC ... *H01M 10/0409* (2013.01); *H01M 10/0587* (2013.01)

(58) Field of Classification Search
　　CPC ...................... H01M 10/0409; H01M 10/0587
　　　　　　　　　　(Continued)

(56) References Cited

U.S. PATENT DOCUMENTS

2001/0046623 A1* 11/2001 Akahira ............ H01M 10/0431
　　　　　　　　　　　　　　　　　　429/161
2002/0192548 A1* 12/2002 Schaefer ............. H01M 8/1004
　　　　　　　　　　　　　　　　　　429/510

(Continued)

FOREIGN PATENT DOCUMENTS

CN　　102017237 A　　4/2011
CN　　102903960 A　　1/2013

(Continued)

OTHER PUBLICATIONS

English language machine translation of "Winding Cell and Battery" by Liu Wei et al. in CN110364769 (Year: 2019).*

(Continued)

*Primary Examiner* — Niki Bakhtiari
*Assistant Examiner* — Omar M Kekia
(74) *Attorney, Agent, or Firm* — ANOVA LAW GROUP, PLLC

(57) ABSTRACT

A cell manufacturing device configured to manufacture a cell including an electrode plate and a separator. The cell manufacturing device includes a winding mechanism configured to wind the electrode plate and the separator to form the cell, and a film attaching mechanism configured to attach a film to the electrode plate or the separator at a predetermined position before the electrode plate and the separator are wound, so as to form a reinforcing film layer on the electrode plate or the separator.

10 Claims, 6 Drawing Sheets

(58) Field of Classification Search

USPC .......................................................... 429/209

See application file for complete search history.

(56) References Cited

U.S. PATENT DOCUMENTS

| | | | | |
|---|---|---|---|---|
| 2004/0170899 | A1* | 9/2004 | Kurimoto | H01M 10/0409 |
| | | | | 29/730 |
| 2010/0212817 | A1* | 8/2010 | Nagare | H01M 4/08 |
| | | | | 156/443 |
| 2011/0091754 | A1 | 4/2011 | Miyahisa et al. | |
| 2013/0133184 | A1* | 5/2013 | Bacci | H01G 9/0029 |
| | | | | 29/730 |
| 2020/0127317 | A1* | 4/2020 | Lee | H01M 10/0459 |

FOREIGN PATENT DOCUMENTS

| | | | |
|---|---|---|---|
| CN | 105810989 | A | 7/2016 |
| CN | 206301890 | U | 7/2017 |
| CN | 107706460 | A | 2/2018 |
| CN | 209183671 | U | 7/2019 |
| CN | 110364769 | A | 10/2019 |
| CN | 110690494 | A | 1/2020 |
| CN | 110875465 | A | 3/2020 |
| CN | 210489752 | U | 5/2020 |
| CN | 212810367 | U | 3/2021 |
| CN | 214706007 | U | 11/2021 |
| JP | H10228900 | A | 8/1998 |
| JP | 2007165268 | A | 6/2007 |
| JP | 2009256052 | A | 11/2009 |
| JP | 2016051538 | A | 4/2016 |
| KR | 20040008235 | A | 1/2004 |
| KR | 101906983 | B1 | 10/2018 |
| WO | 2011077499 | A1 | 6/2011 |
| WO | 2020136834 | A1 | 7/2020 |

OTHER PUBLICATIONS

The Japan Patent Office (JPO) Decision to Grant a Patent for Application No. 2022-553009 Oct. 29, 2024 5 Pages (including translation).

The Japan Patent Office (JPO) Notice of Reasons for Refusal for Application No. 2022-553009 May 7, 2024 10 Pages (including translation).

The Korean Patent Office(KPO) Request for the Submission of an Opinion for Application No. 10-2022-7030234 Sep. 13, 2024 13 pages (including translation).

The European Patent Office (EPO) The Extended European Search Report for 22758415.8 Oct. 16, 2023 6 Pages.

The Japan Patent Office (JPO) Notification of Reasons for Refusal for Application No. 2022-553009 Nov. 7, 2023 12 Pages (including translation).

The World Intellectual Property Organization (WIPO) International Search Report and Written Opinion for PCT/CN2022/082761 May 30, 2022 21 Pages (including translation).

The Korean Intellectual Property Office Notice of Allowance for Application No. 10-2022-7030234 May 27, 2025 4 Pages (including translation).

State Intellectual Property Office of China the First Office Action for Application No. 202110610984.Jul. 5, 24, 2025 14 pages (including translation).

\* cited by examiner

CELL MANUFACTURING DEVICE AND METHOD, BATTERY, AND POWER CONSUMING APPARATUS

CROSS-REFERENCE TO RELATED APPLICATION

The present application is a continuation of International Application No. PCT/CN2022/082761, filed on Mar. 24, 2022, which claims the priority of Chinese patent application no. 202110610984.5, entitled "CELL MANUFACTURING DEVICE AND METHOD, BATTERY, AND POWER CONSUMING APPARATUS" and filed on Jun. 1, 2021, the entire contents of both of which are incorporated herein by reference.

TECHNICAL FIELD

The present application relates to the technical field of batteries, and in particular to a cell manufacturing device and method, a battery, and a power consuming apparatus.

BACKGROUND ART

During production of batteries, a winding device is required for winding electrode plates and a separator into a cell. In the related art, a film is attached to the cell after the cell has been prepared by winding by means of the winding device, and therefore the mechanical property of the electrode plate or separator cannot be enhanced for an internal structure of the cell.

Moreover, the process is complicated, and the cell winding efficiency is low.

SUMMARY

The present application provides a cell manufacturing device and method, a battery, and a power consuming apparatus. During manufacture of a cell, a film can be attached to an electrode plate or separator at a predetermined position while the electrode plate or separator is conveyed, thereby enhancing the mechanical property of the electrode plate or separator, simplifying the process, and improving the cell winding efficiency.

In a first aspect, the present application provides a cell manufacturing device configured to manufacture a cell comprising electrode plates and a separator. The cell manufacturing device comprises: a winding mechanism configured to wind the electrode plates and the separator to form the cell; and a film attaching mechanism configured to attach a film to the electrode plate or separator at a predetermined position before the electrode plates and the separator are wound, so as to form a reinforcing film layer on the electrode plate or separator.

The reinforcing film layer is formed by attaching the film to the electrode plate or separator at the predetermined position, thereby improving the mechanical property of the electrode plate or separator. During delivery of the electrode plate or separator, the electrode plate or separator is subjected to a film attaching operation, which improves the cell winding efficiency.

In a possible design, the cell manufacturing device further comprises a feeding unit provided between the film attaching mechanism and the winding mechanism, the feeding unit being configured to deliver the electrode plate or separator with a predetermined length, so that the film attaching mechanism is able to determine the predetermined position on the basis of the delivery of the electrode plate or separator with a predetermined length.

The electrode plate or separator with a predetermined length is delivered by means of the feeding unit, so that the predetermined position where the film is attached is determined according to the predetermined length, and thus a film attaching position on the electrode plate or separator can be precisely controlled.

In a possible design, the feeding unit comprises a plurality of feed rollers, the plurality of feed rollers being provided at intervals, so that the electrode plate or separator with a predetermined length can be delivered between the plurality of feed rollers.

With the plurality of feed rollers provided at intervals, the separator with a predetermined length can be delivered, thereby ensuring a more precise film attaching position on the separator.

In a possible design, at least one of the plurality of feed rollers is adjustable in position, so that the length of the electrode plate or separator delivered by means of the feeding unit is adjusted.

One or more of the feed rollers is adjustable in position, so that the length of the electrode plate or separator on the feeding unit can be adjusted according to needs so as to ensure that the conveyed length of the separator is the predetermined length.

In a possible design, the cell manufacturing device further comprises a detection unit and a control unit, wherein the detection unit is configured to detect material parameters of the electrode plate or separator and transmit the material parameters to the control unit, and the control unit adjusts the position of the feed roller according to the material parameters so as to adjust the length of the electrode plate or separator delivered by means of the feeding unit.

The detection unit detects the material parameters, so that the delivered length of the separator can be adjusted according to the material parameters to ensure that the length of the separator on the feeding unit is the predetermined length, thereby precisely determining the predetermined position where the film is attached to the separator.

In a possible design, the detection unit comprises a sensor connected to the feeding unit and configured to detect the positions of the plurality of feed rollers and transmit a detection result to the control unit; and the control unit adjusts the length of the electrode plate or separator delivered by means of the feeding unit according to the detection result.

The sensor detects the positions of the feed rollers, so that whether the length of the separator on the feeding unit matches the set predetermined length can be determined.

In a possible design, the film attaching mechanism comprises: a film unwinding unit configured to convey the film; a cutting unit configured to cut the film when the film with a predetermined length is conveyed by means of the film unwinding unit; and an attaching unit configured to attach the film cut by the cutting unit to the electrode plate or separator at the predetermined position.

With the film attaching mechanism, during delivery of the electrode plate or separator, the electrode plate or separator can be subjected to the film attaching operation, so as to form the reinforcing film layer on the electrode plate or separator.

In a possible design, the attaching unit comprises: a film suction mechanism configured to suck the cut film; and a pressing mechanism configured to press the sucked film to the electrode plate or separator at the predetermined position.

The film is sucked and then pressed onto the electrode plate or separator, which simplifies the film attaching operation and improves the production efficiency.

In a possible design, the pressing mechanism is provided with a heating apparatus.

The heating apparatus heats the film so that the film melts to be sticky, which facilitates bonding of the separator by thermal compounding.

In a possible design, the pressing mechanism is a pressing roller or a pressing plate.

The pressing roller or pressing plate has a simple structure and is capable of achieving a good film attaching effect and improving the production efficiency.

In a possible design, the cell manufacturing device further comprises an electrode plate unwinding unit, a separator unwinding unit, an electrode plate delivery unit and a separator delivery unit, wherein the electrode plate unwinding unit is configured to output the electrode plate to the electrode plate delivery unit, the separator unwinding unit is configured to output the separator to the separator delivery unit, and the electrode plate delivery unit and the separator delivery unit are respectively configured to deliver the electrode plate and the separator to the winding mechanism.

The electrode plate unwinding unit and the separator unwinding unit are used to continuously provide the electrode plate and the separator, so that the winding mechanism can perform continuous winding of the cell, thereby improving the production efficiency. The electrode plate delivery unit and the separator delivery unit can provide a tensioning force to delivery of the electrode plate and the separator and clamp tail ends of the electrode plate and the separator that are cut and initial ends of the next section of the electrode plate and the separator.

In a possible design, the predetermined position is a position where the electrode plate or separator is bent during winding.

The film is attached to the position where the electrode plate or separator is bent during winding, so that the mechanical property of the bent position can be improved.

In a second aspect, the present application provides a method for manufacturing a cell comprising electrode plates and a separator. The method comprises the following steps: attaching a film to the electrode plate or separator at a predetermined position, so as to form a reinforcing film layer on the electrode plate or separator; and winding the electrode plates and the separator to form the cell.

In a possible design, the cell manufacturing method further comprises the following steps: conveying the electrode plates and the separator each with a predetermined length; attaching the film to the electrode plate or separator at the predetermined position every time the delivery of the electrode plates and the separator each with a predetermined length is finished.

In a possible design, the cell manufacturing method further comprises the following step: adjusting a conveying distance of the electrode plate or separator to deliver the electrode plate or separator with a predetermined length.

In a possible design, the adjusting a conveying distance of the electrode plate or separator to deliver the electrode plate or separator with a predetermined length comprises: detecting material parameters of the electrode plate or separator, and adjusting the conveying distance of the electrode plate or separator according to the material parameters.

In a third aspect, the present application provides a battery, comprising a cell manufactured by a cell manufacturing method as described above, wherein the film is attached to at least one of the electrode plates or the separator of the cell at the predetermined position.

In a fourth aspect, the present application provides a power consuming apparatus, comprising a battery as described above, the battery being configured to provide electric energy.

According to the cell manufacturing device and method of the present application, during manufacture of the cell, the film can be attached to the electrode plate or separator at the predetermined position while the electrode plates and the separator are conveyed, thereby simplifying the process and improving the cell winding efficiency. Moreover, during winding of the cell, the conveying distance of the electrode plate or separator is adjusted to adjust the predetermined position where the film is attached, thereby improving the precision of the position of the reinforcing film layer.

According to the battery and the power consuming apparatus of the present application, the cell of the battery is manufactured by the cell manufacturing device and method as described above. The reinforcing film layer is attached to at least one of the electrode plates or the separator of the cell at the predetermined position, so that the mechanical properties of the electrode plate and the separator are improved, and thus the service life of the battery is prolonged.

BRIEF DESCRIPTION OF THE DRAWINGS

In order to more clearly illustrate the technical solutions of embodiments of the present application, the drawings to be used in the description of the embodiments of the present application will be described briefly below. Obviously, the drawings in the following description are merely specific embodiments of the present application. For those skilled in the art, other embodiments can also be obtained according to the following drawings without any creative effort.

Figures 1, 2:
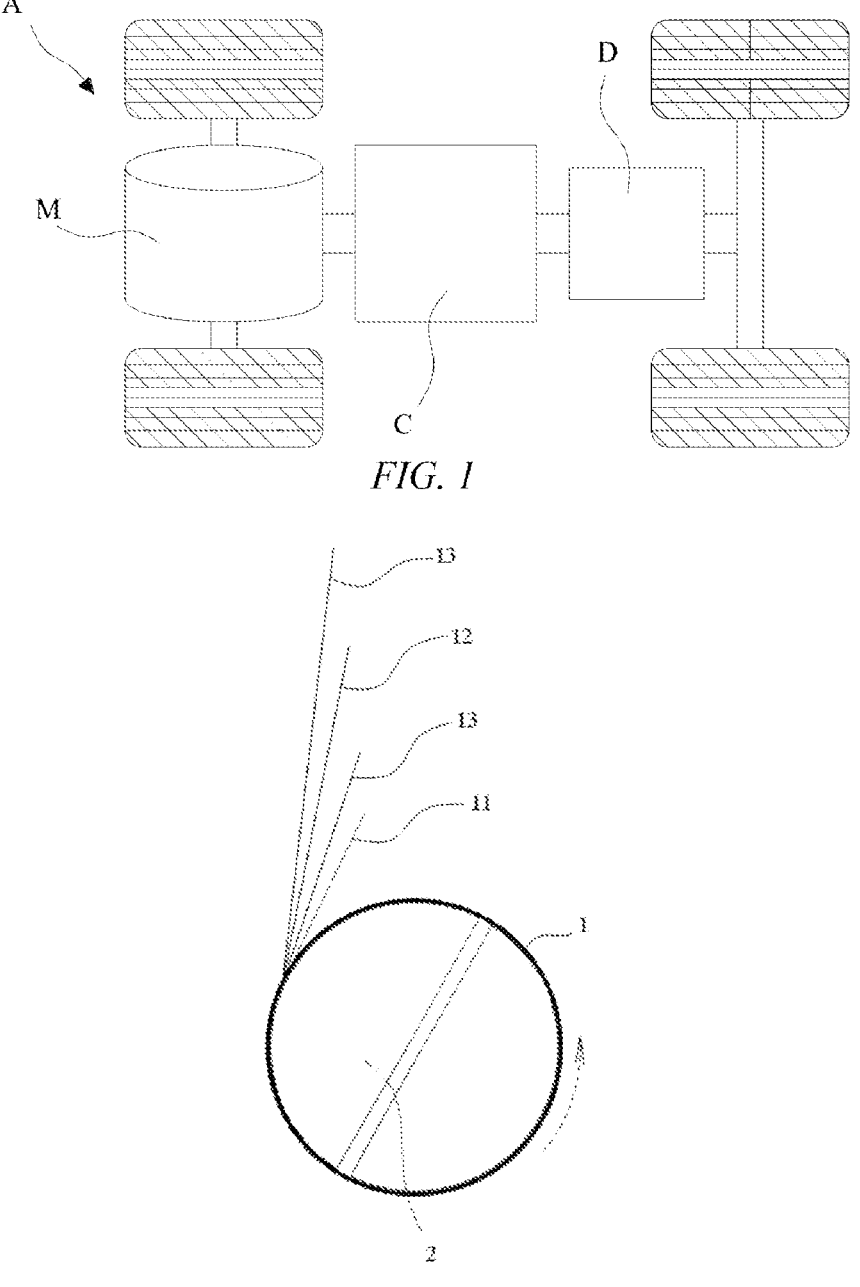
FIG. 1 is a schematic structural diagram of a vehicle according to a first embodiment of the present application.
FIG. 2 is a schematic diagram of winding a first electrode plate, a second electrode plate and a separator by means of a winding mechanism according to an embodiment of the present application.

In the accompanying drawings, the figures are not drawn to the actual scale.

Reference numerals: A. Vehicle; C. Controller; M. Motor; D. Battery; X. Center line; 100. Cell manufacturing device; 1. Cell; 11. First electrode plate; 12. Second electrode plate; 13. Separator; 131. First film attaching position; 132. Second film attaching position; 14. Film; 2. Winding mechanism; 3. Film attaching mechanism; 31. Film unwinding unit; 32. Cutting unit; 33. Attaching unit; 331. Film suction mechanism; 332. Pressing mechanism; 4. Electrode plate unwinding unit; 5. Separator unwinding unit; 6. Electrode plate delivery unit; 7. Separator delivery unit; 8. Feeding unit; 81. Feed roller; 81*a*. First feed roller; 81*b*. Second feed roller; 81*c*. Third feed roller; 81*d*. Fourth feed roller; 81*e*. Fifth feed roller; 81*f* Sixth feed roller; 81*g*. Seventh feed roller; 81*h*. Eighth feed roller; 81*i*. Ninth feed roller; 81*j*. Tenth feed roller; 9. Control unit; 91. Computer; 92. Touch screen; 93. Controller; 10. Detection unit; 101. Sensor.

The accompanying drawings herein are incorporated into the description and constitute part of the description, illustrate the embodiments conforming to the present application, and are intended to explain the principles of the present application together with the description.

DETAILED DESCRIPTION OF EMBODIMENTS

To better understand the technical solutions of the present application, embodiments of the present application will be described in detail below with reference to the accompanying drawings.

Apparently, the following embodiments are merely some of the embodiments of the present application. All the other embodiments obtained by those skilled in the art based on the following embodiments without any creative effort shall fall within the scope of protection of the present application.

The terms used in the embodiments of the present application are merely for the purpose of describing specific embodiments, but are not intended to limit the present application. The terms "a/an", "the" and "this" of singular forms used in the embodiments and the appended claims of the present application are also intended to include plural forms, unless otherwise specified in the context clearly.

It should be understood that the term "and/or" used herein is merely intended to describe the associated relationship of associated objects, representing that three relationships may exist, for example, A and/or B, may include: the three instances of A alone, A and B simultaneously, and B alone. In addition, the character "/" herein generally indicates an "or" relationship between the associated objects.

It should be noted that the directional terms such as "above", "under", "left", and "right" described in the embodiments of the present application are described as seen from the angles shown in the accompanying drawings, and should not be understood as limitations to the embodiments of the present application. In addition, in the context, it should be further understood that when an element is referred to as being "above" or "under" another element, the element can not only be directly connected "above" or "under" the another element, but also be indirectly connected "above" or "under" the another element by means of an intermediate element.

Embodiments of the present application provides a battery D, and an apparatus using the battery D as a power supply.

The apparatus using the battery D as a power supply includes a vehicle A, a ship, a small aircraft, etc. The battery D is used in the apparatus to provide electric energy to generate a driving force for driving the apparatus. The apparatus can also use electric energy and other types of energy (such as fossil energy) at the same time to jointly generate a driving force. Therefore, any apparatus that can use the battery D as a power supply falls within the protection scope of the present application.

FIG. 1 is a schematic structural diagram of a vehicle according to an embodiment of the present application.

As shown in FIG. 1, taking the vehicle A as an example, the vehicle A in the embodiment of the present application may be a new-energy vehicle, which may be a battery electric vehicle, or may be a hybrid electric vehicle or an extended-range electric vehicle. For example, the vehicle A comprises a motor M, a controller C and a battery D. The battery D is horizontally provided at the bottom of a vehicle body. The controller C controls the battery D to supply power to the motor M. The motor M is connected to wheels on the vehicle body by means of a transmission mechanism so as to drive the vehicle A to run.

Electrode plates and a separator are wound to form a cell of the battery D. During manufacture of the cell, the electrode plates and the separator are wound into the cell by means of a winding mechanism of a cell manufacturing device.

FIG. 2 is a schematic diagram of winding a first electrode plate 11, a second electrode plate 12 and a separator 13 by means of a winding mechanism 2 according to an embodiment of the present application.

As shown in FIG. 2, the first electrode plate 11, the second electrode plate 12 and the separator 13 are wound by means of the winding mechanism 2, the first electrode plate 11 and the second electrode plate 12 have opposite polarities, and one of them is a positive electrode plate, and the other is a negative electrode plate. The separator 13 is an insulator between the first electrode plate 11 and the second electrode plate 12. The first electrode plate 11, the second electrode plate 12 and the separator 13 are wound by means of the winding mechanism 2 to form a cell 1.

Figure 3:
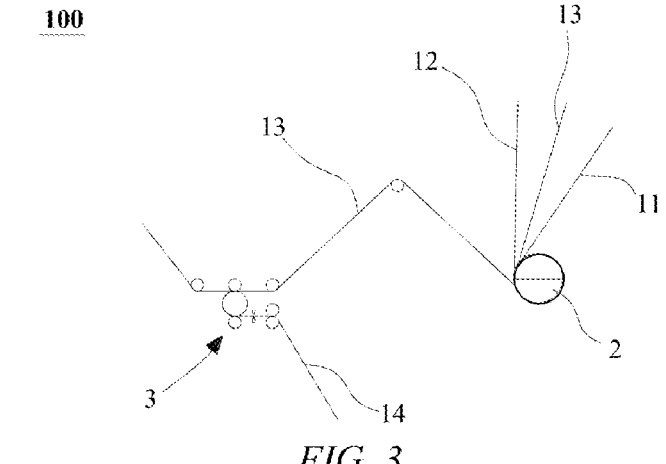
FIG. 3 is a schematic diagram of a cell manufacturing device according to an embodiment of the present application.

FIG. 3 is a schematic diagram of a cell manufacturing device 100 according to an embodiment of the present application.

As shown in FIG. 3, the cell manufacturing device 100 of the present application comprises a winding mechanism 2 and a film attaching mechanism 3. The film attaching mechanism 3 is configured to attach a film 14 to the first electrode plate 11, second electrode plate 12 or separator 13 at a predetermined position, so as to form a reinforcing film layer on the first electrode plate 11, second electrode plate 12 or separator 13. The winding mechanism 2 is configured to wind the first electrode plate 11, the second electrode plate 12 and the separator 13 to form the cell 1.

The film 14 can be attached to any one or more of the first electrode plate 11, the second electrode plate 12 and the separator 13 to form the reinforcing film layer on the first electrode plate 11, the second electrode plate 12 or the separator 13, thereby enhancing the mechanical property of the electrode plate or separator.

The specific position where the film 14 is attached to the first electrode plate 11, the second electrode plate 12 and the separator 13 can be determined according to the structure of the cell and stress conditions of each electrode plate and the separator 13 after winding. For example, the first electrode plate 11, the second electrode plate 12 and the separator 13 are bent during winding, the bent position is called a corner position, and the film 14 is attached to the electrode plate or separator 13 at the corner position, so that the mechanical property at the corner position can be enhanced. Alternatively, since an inner ring of the cell 1 is subjected to a maximum extrusion force, the electrode plate or separator 13 is prone to breakage. The film 14 can be attached to the position of the inner ring of each of the electrode plate and the separator 13 after being wound, so as to prevent breakage.

According to needs, the film 14 can be attached to an inner side or outer side or both of each of the first electrode plate 11, the second electrode plate 12 and the separator 13. The inner side refers to an inner peripheral surface of the electrode plate or separator 13 facing a central axis of the cell after winding, and the outer side refers to an outer peripheral surface of the electrode plate or separator 13 opposite the inner side. At the corner position, the inner side of the electrode plate and the separator 13 is squeezed while the outer side thereof is stretched, and it is possible to prevent removal of powder from the electrode plate by attaching the film 14 to the inner side of each of the electrode plate and the separator 13 and to prevent breakage of the electrode plate by attaching the film 14 to the outer side of each of the electrode plate and the separator 13.

In the following embodiments, the film 14 being attached to the separator 13 is taken as an example for a detailed description.

As shown in FIG. 3, by means of the film attaching mechanism 3, the film 14 is attached to the separator 13 at a predetermined position, so as to form a reinforcing film layer on the separator 13. The separator 13 attached with the reinforcing film layer is delivered to the winding mechanism 2, and the separator 13 attached with the reinforcing film layer is wound together with the first electrode plate 11 and the second electrode plate 12 by means of the winding mechanism 2, so as to form the cell 1.

In FIG. 3, only one film attaching mechanism 3 is shown for attaching the film to the separator 13. Of course, FIG. 3 is merely an example. The film attaching mechanism 3 can also be used for attaching the film to the first electrode plate 11 or the second electrode plate 12. Alternatively, the cell manufacturing device 100 may also comprise a plurality of film attaching mechanisms 3 for attaching the film to one or more of the first electrode plate 11, the second electrode plate 12 and the separator 13, respectively.

In a specific embodiment, when the first electrode plate 11, the second electrode plate 12 and the separator 13 are wound into the cell 1, every time the separator 13 with a predetermined length is conveyed, one film attachment is performed on the separator 13 by means of the film attaching mechanism 3 to attach the film 14 to the separator 13, so that a plurality of reinforcing film layers spaced apart by a certain distance are formed on the separator 13. A distance between the adjacent reinforcing film layers on the separator 13 can be set according to the structure and stress condition of the cell 1. For example, a section of the film 14 can be attached to the separator 13 at a predetermined position, so that a section of reinforcing film layer is formed in one cell 1. It is also possible to attach a section of the film 14 to the separator 13 at a plurality of predetermined positions, respectively, so that a plurality of sections of reinforcing film layers are formed in one cell 1.

According to the cell manufacturing device 100 in this embodiment, during manufacture of the cell 1, while the first electrode plate 11, the second electrode plate 12 and the separator 13 are conveyed to the winding mechanism 2, the film 14 is attached to the first electrode plate 11, second electrode plate 12 or separator 13 by means of the film attaching mechanism 3 to form the reinforcing film layer, thereby enhancing the mechanical property of the electrode plate or separator 13.

Figure 4:
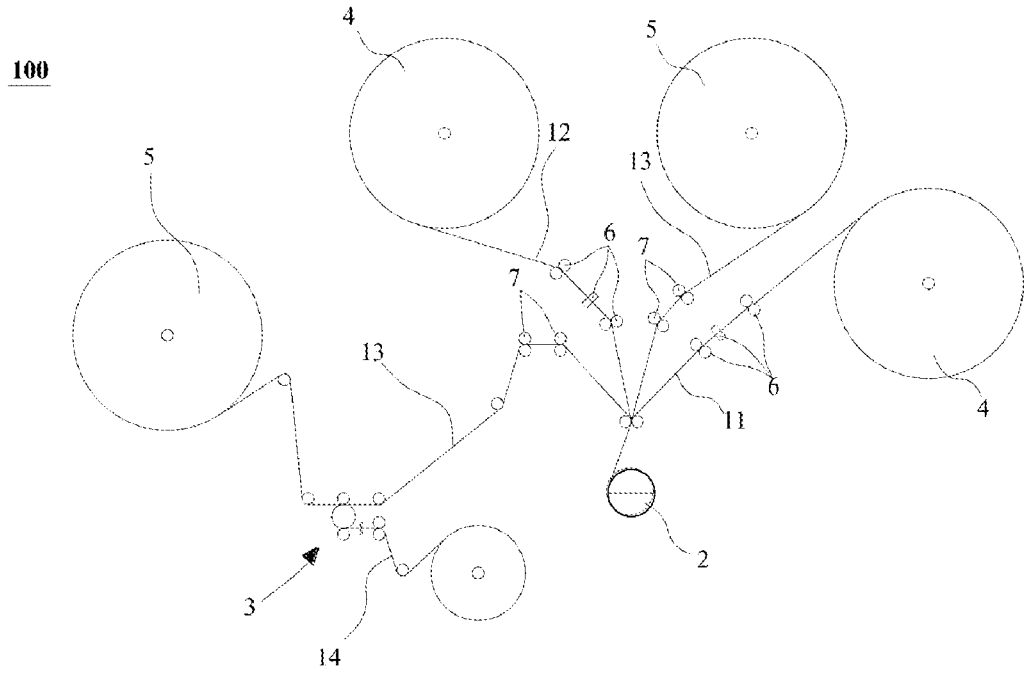
FIG. 4 is a schematic diagram of a cell manufacturing device according to another embodiment of the present application.

FIG. 4 is a schematic diagram of a cell manufacturing device 100 according to another embodiment of the present application.

As shown in FIG. 4, in another embodiment, the cell manufacturing device 100 further comprises an electrode plate unwinding unit 4, a separator unwinding unit 5, an electrode plate delivery unit 6 and a separator delivery unit 7. The winding mechanism 2 and the film attaching mechanism 3 of the cell manufacturing device 100 are the same as those in the foregoing embodiments.

The electrode plate unwinding unit 4 is configured to provide an electrode plate to the winding mechanism 2. In this embodiment, the cell manufacturing device 100 comprises two electrode plate unwinding units 4, which respectively provide the first electrode plate 11 and the second electrode plate 12. The separator unwinding unit 5 is configured to provide the separator 13 to the winding mechanism 2. In this embodiment, the cell manufacturing device 100 comprises two separator unwinding units 5. The number of electrode plate unwinding units 4 and separator unwinding units 5 is not limited to two, and the number thereof can be set according to the specific structural form of the cell 1.

Corresponding to each electrode plate unwinding unit 4, one electrode plate delivery unit 6 is provided. The electrode plate unwinding unit 4 outputs an electrode plate to the electrode plate delivery unit 6. In this embodiment, the two electrode plate unwinding units 4 respectively output the first electrode plate 11 and the second electrode plate 12 to the corresponding electrode plate delivery units 6. Corresponding to each separator unwinding unit 5, one separator delivery unit 7 is provided. The separator unwinding unit 5 outputs the separator 13 to the separator delivery unit 7. In this embodiment, the two separator unwinding units 5 respectively output the separators 13 to the corresponding separator delivery units 7. The electrode plate delivery units 6 and the separator delivery units 7 respectively deliver the first electrode plate 11, the second electrode plate 12 and the separators 13 to the winding mechanism 2. By means of the winding mechanism 2, the first electrode plate 11, the second electrode plate 12 and the separators 13 are wound in a predetermined number of turns to form the cell 1.

Figure 5:
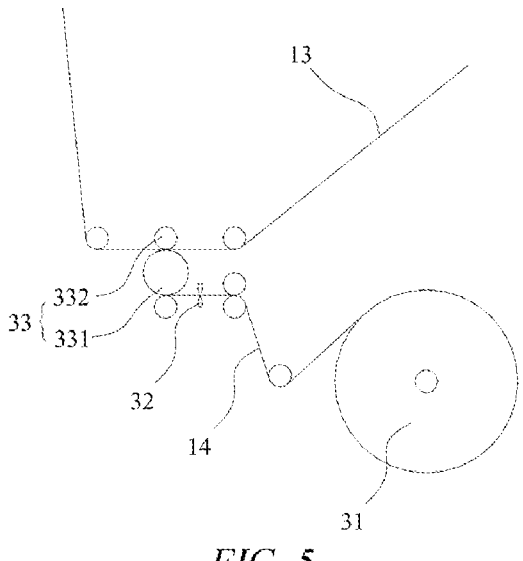
FIG. 5 is a schematic diagram of a film attaching mechanism according to a specific embodiment of the present application.

FIG. 5 is a schematic diagram of a film attaching mechanism 3 according to a specific embodiment of the present application.

As shown in FIG. 5, in a specific embodiment, the film attaching mechanism 3 comprises a film unwinding unit 31, a cutting unit 32 and an attaching unit 33.

The film unwinding unit 31 is configured to convey the film 14. The cutting unit 32 is provided between the film unwinding unit 31 and the attaching unit 33. The cutting unit 32 is configured to cut the film 14 when the film 14 with a predetermined length is conveyed by means of the film unwinding unit 31. The predetermined length and width of the film 14 can be set and adjusted according to the specific structure of the cell 1. The attaching unit 33 is configured to attach the film 14 cut by the cutting unit 32 to the separator 13 at the predetermined position.

As shown in FIGS. 4 and 5, in a specific embodiment, the film attaching mechanism 3 is provided after the separator unwinding unit 5. The separator unwinding unit 5 delivers the separator 13 to the attaching unit 33 of the film attaching mechanism 3. By means of the attaching unit 33, the film 14 is attached to the separator 13 to form a reinforcing film layer, thereby improving the mechanical property of the separator 13.

As shown in FIG. 5, in a specific embodiment, the attaching unit 33 comprises a film suction mechanism 331 and a pressing mechanism 332. The film suction mechanism 331 is configured to suck the cut film 14. The pressing mechanism 332 is configured to press the sucked film 14 to the separator 13 at the predetermined position.

In a specific embodiment, after the separator 13 passing through the pressing mechanism 332 is delivered by a predetermined length, the film 14 is attached again by means of the attaching unit 33, so that the film 14 is attached to the separator 13 at the predetermined position. For example, when the predetermined position on the separator 13 is set as the position of an inner ring of the separator 13 of the cell 1, a film attaching operation can be performed once at an initial delivery position on the separator 13. The next film attaching operation is performed after the separator 13 is continuously delivered by the length for winding of one cell 1, so that a reinforcing film layer is formed on the inner ring of the wound separator 13 of each cell 1 to enhance the mechanical property of the separator 13.

In a specific embodiment, the pressing mechanism 332 is provided with a heating apparatus. When the separator 13 is subjected to the film attaching operation, the heating apparatus heats the film 14, so that a heated area of the film 14 melts to be sticky, achieving thermal compounding of the film 14 and the separator 13.

In some embodiments, the pressing mechanism 332 may be a pressing roller. After the film 14 with a predetermined length is provided by means of the film unwinding unit 31, the cutting unit 32 cuts the film 14 and delivers the film 14 with a predetermined length to the film suction mechanism 331 of the attaching unit 33. By means of the film suction mechanism 331, the cut film 14 with a predetermined length is sucked and delivered to the pressing roller, and at the same time, the separator 13 is delivered to the pressing roller by means of the separator unwinding unit 5. The pressing roller presses the film 14 sucked on the film suction mechanism 331 to the separator 13, and at this time, a reinforcing film layer is formed on the separator 13 that has been rolled by means of the pressing roller.

A heating apparatus may be provided in the pressing roller. When the film is attached to the separator 13, the pressing roller heats the separator 13 and the film 14 sucked by means of the film suction mechanism 331 and rolls them into a whole, thereby forming the reinforcing film layer on the separator 13.

In some other embodiments, the pressing mechanism 332 may be a pressing plate. After the film 14 with a predetermined length is provided by means of the film unwinding unit 31, the cutting unit 32 cuts the film 14 and delivers the film 14 with a predetermined length to the film suction mechanism 331 of the attaching unit 33. By means of the film suction mechanism 331, the cut film 14 with a predetermined length is sucked and delivered to the pressing plate, and at the same time, the separator 13 is delivered to the pressing plate by means of the separator unwinding unit 5. The pressing plate presses the film 14 sucked on the film suction mechanism 331 to the separator 13, and at this time, a reinforcing film layer is formed on the separator 13 that has been pressed by means of the pressing plate.

A heating apparatus may be provided in the pressing plate. When the film is attached to the separator 13, the pressing plate heats the separator 13 and the film 14 sucked by means of the film suction mechanism 331 and presses them into a whole, thereby forming the reinforcing film layer on the separator 13.

Figure 6:
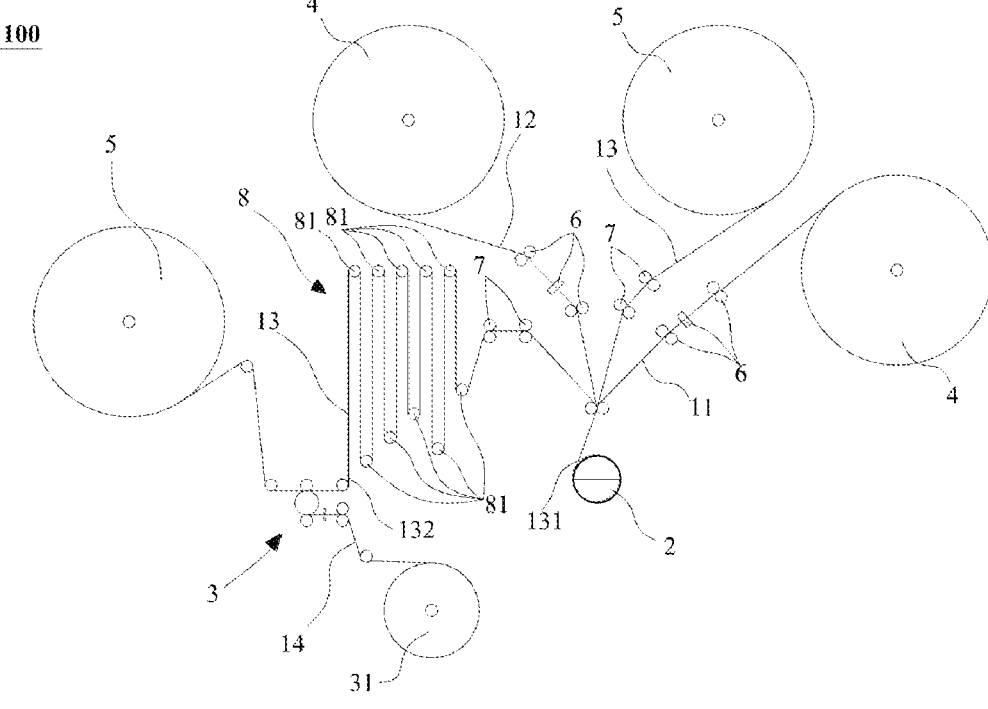
FIG. 6 is a schematic diagram of a cell manufacturing device according to another embodiment of the present application.

FIG. 6 is a schematic diagram of a cell manufacturing device 100 according to another embodiment of the present application.

When the first electrode plate 11, the second electrode plate 12 and the separator 13 are wound by means of the winding mechanism 2, the unwinding speeds of the electrode plate unwinding unit 4 and the separator unwinding unit 5, and the delivery speeds of the electrode plate delivery unit 6 and the separator delivery unit 7 will be different, and the delivery speeds of the electrode plate and the separator 13 are not constant. If the film attaching position is controlled according to the delivery speed of the electrode plate or separator 13, the film attaching position will be deviated, resulting in inaccurate film attaching and affecting the effect of the reinforcing film layer.

As shown in FIG. 6, in another embodiment, in order to enable the film attaching mechanism 3 to accurately attach the film 14 to the separator 13 at a predetermined position, the cell manufacturing device 100 further comprises a feeding unit 8. The feeding unit 8 is configured to deliver the electrode plate or separator 13 with a predetermined length. The film attaching mechanism 3 determines a film attaching position according to each electrode plate or separator 13 with a predetermined length, so that the film 14 can be accurately attached to the separator 13 at the predetermined position to ensure the precision of the position of the reinforcing film layer.

In this embodiment, the winding mechanism 2, the film attaching mechanism 3, the electrode plate unwinding unit 4, the separator unwinding unit 5, the electrode plate delivery unit 6 and the separator delivery unit 7 of the cell manufacturing device 100 are the same as those in the foregoing embodiments.

As shown in FIG. 6, the feeding unit 8 in this embodiment is provided between the film attaching mechanism 3 and the winding mechanism 2, and specifically between the film attaching mechanism 3 and the separator delivery mechanism 7 to deliver the separator 13 with a predetermined length.

When the film is attached to more than one of the first electrode plate 11, the second electrode plate 12 and the separator 13, a plurality of film attaching mechanisms 3 can be provided, and one feeding unit 8 can be provided after each film attaching mechanism 3 to deliver the first electrode plate 11, second electrode plate 12 or separator 13 with a predetermined length.

In this embodiment, the film being attached to the separator 13 is taken as an example for a detailed description.

The separator unwinding unit 5 outputs the separator 13 to the film attaching mechanism 3. The film attaching mechanism 3 performs film attachment on the separator 13 to attach the film 14 to the separator 13 to form a reinforcing film layer and then delivers the separator to the feeding unit 8. The feeding unit 8 can hold the separator 13 with a predetermined length, and delivers the separator 13 with a predetermined length that is attached with the film to the separator delivery unit 7, and the separator delivery unit 7 conveys the separator 13 to the winding mechanism 2.

In a specific embodiment, the film attaching mechanism 3 attaches the film 14 to the separator 13 at a predetermined position to form a reinforcing film layer, and then delivers the separator to the feeding unit 8. The feeding unit 8 holds the separator 13 with a predetermined length, and delivers the separator 13 with a predetermined length to the separator delivery unit 7, and the separator delivery unit 7 conveys the separator 13 to the winding mechanism 2. As shown in FIG. 6, the separator 13 has a first film attaching position 131. When the first film attaching position 131 is delivered to the winding mechanism 2, the first electrode plate 11, the second electrode plate 12 and the separator 13 with a predetermined length are wound by means of the winding mechanism 2. At this time, the film attaching mechanism 3 attaches the next section of the film 14 to the separator 13 at a second film attaching position 132. As the separator 13 is wound by means of the winding mechanism 2, the first film attaching position 131 on the separator 13 is wound into the cell 1, and the second film attaching position 132 is delivered into the feeding unit 8 and to the winding mechanism 2.

In a specific embodiment, the length of the separator 13 between the first film attaching position 131 and the second film attaching position 132 is set as the length of the separator 13 required for winding of one cell 1. In this case, when starting the winding of one cell 1, the film attaching operation of the separator 13 of the next cell 1 is started, so that the formation of a reinforcing film layer on a fixed position on the separator 13 of the cell 1 can be accurately controlled.

Attaching the film 14 at the first film attaching position 131 and the second film attaching position 132 is merely an example. Any position where the film 14 is attached to the separator 13 can be selected according to the specific mechanical property requirements of the internal structure of the cell 1. The specific film attaching position can be set by adjusting the predetermined length of the separator 13 on the feeding unit 8.

Figure 7:
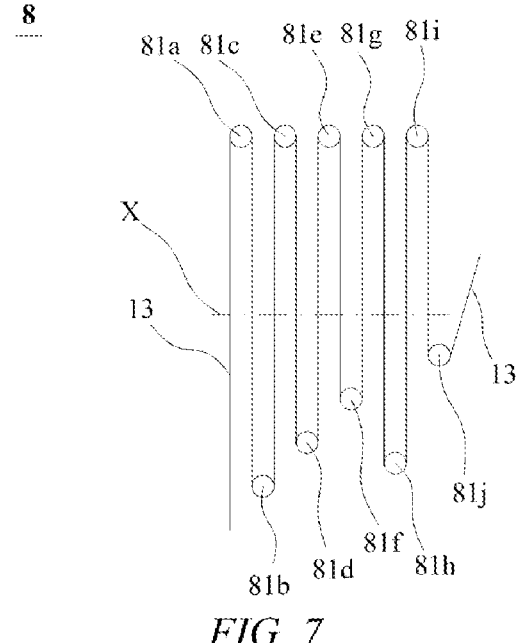
FIG. 7 is a schematic diagram of a feeding unit according to an embodiment of the present application.

FIG. 7 is a schematic diagram of a feeding unit 8 according to an embodiment of the present application.

As shown in FIG. 7, the feeding unit 8 comprises a plurality of feed rollers 81, and the plurality of feed rollers 81 are provided at intervals, so that the plurality of feed rollers 81 deliver the separator 13 with a predetermined length.

In a specific embodiment, the feeding unit 8 comprises a first feed roller 81a, a second feed roller 81b, a third feed roller 81c, a fourth feed roller 81d, a fifth feed roller 81e, a sixth feed roller 81f, a seventh feed roller 81g, an eighth feed roller 81h, a ninth feed roller 81i, and a tenth feed roller 81j. The number and arrangement mode of feed rollers 81 can be set according to the actual conditions of the device and site, and are not limited to the number and arrangement mode shown in FIG. 7.

During conveying of the separator 13, the film attaching mechanism 3 attaches the film 14 to the separator 13, and then delivers the separator 13 to the feeding unit 8. The separator 13 is firstly delivered to the first feed roller 81a, and then sequentially delivered to the second feed roller 81b, the third feed roller 81c, the fourth feed roller 81d, the fifth feed roller 81e, the sixth feed roller 81f, the seventh feed roller 81g, the eighth feed roller 81h, the ninth feed roller 81i and the tenth feed roller 81j according the arrangement mode of the plurality of feed rollers 81, and then is conveyed by means of the tenth feed roller 81j to a subsequent mechanism, for example, the separator delivery unit 7 or the winding mechanism 2. The separator 13 with a predetermined length is delivered from the first feed roller 81a to the tenth feed roller 81j. Therefore, the length of the separator 13 delivered from the film attaching mechanism 3 to the winding mechanism 2 is fixed, for example, the fixed length is a length of the separator 13 required for winding of one cell 1.

As shown in FIG. 7, the plurality of feed rollers 81 are distributed on two sides of a center line X, for example, the feed rollers 81a, 81c, 81e, 81g, 81i are located on one side of the center line X, and the feed rollers 81b, 81d, 81f, 81h, 81j are located on the other side of the center line X. The separator 13 is delivered by means of the first feed roller 81a to the second feed roller 81b, and then the separator 13 is delivered by means of the second feed roller 81b to the third feed roller 81c until the separator 13 is conveyed to the tenth feed roller 81j. The separator 13 is serpentinely delivered between the plurality of feed rollers 81, so that the feeding unit 8 can deliver a relatively long separator 13, thereby saving the space. Of course, the arrangement mode of the plurality of feed rollers 81 is not limited to the serpentine arrangement described above, and can be arranged in a specific manner as required.

With the plurality of feed rollers 81, the position where the film is attached can be flexibly adjusted.

In a specific embodiment, the position of one or more feed rollers 81 on one side of the center line X can be set to be adjustable, so that the length of the separator 13 delivered from one feed roller 81 to the next feed roller 81 can be adjusted. The positions of the feed rollers 81 on both sides can also be set to be adjustable, so that the length of the separator 13 between the plurality of feed rollers 81 can be adjusted more flexibly, thereby precisely determining the predetermined position where the film is attached to the separator 13.

Figure 8:
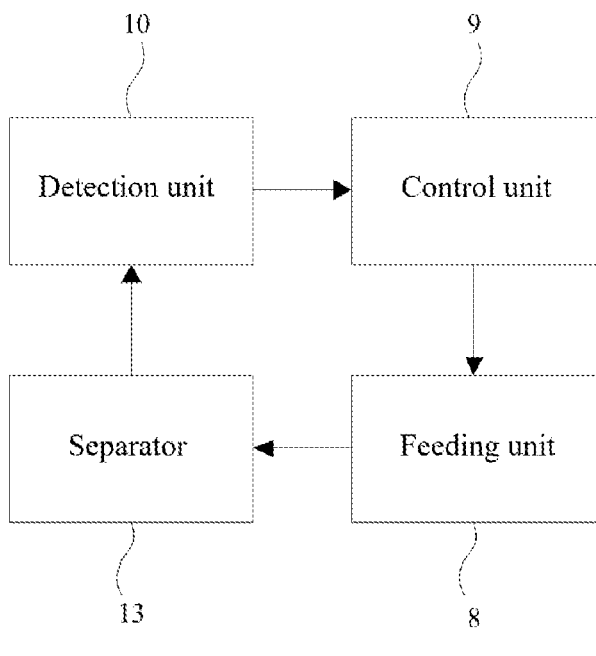
FIG. 8 is a functional block diagram of a feeding unit adjusting a delivery length of a separator according to a specific embodiment of the present application.

FIG. 8 is a functional block diagram of a feeding unit 8 adjusting a delivery length of a separator 13 according to a specific embodiment of the present application.

As shown in FIG. 8, in a specific embodiment, the cell manufacturing device 100 further comprises a detection unit 10 and a control unit 9. The detection unit 10 is configured to detect material parameters of the first electrode plate 11, the second electrode plate 12 and/or the separator 13 and transmit the material parameters to the control unit 9. The control unit 9 adjusts the position of the feed roller 81 according to the material parameters so as to adjust the length of the first electrode plate 11, the second electrode plate 12 and/or the separator 13 delivered by means of the feeding unit 8. The material parameters include parameters such as the thickness of the first electrode plate 11, the second electrode plate 12 or the separator 13, and the positions of tabs of the first electrode plate 11 or the second electrode plate 12.

In some embodiments, when the first electrode plate 11, the second electrode plate 12 and the separator 13 are wound by means of the winding mechanism 2, the lengths of the first electrode plate 11, the second electrode plate 12 and the separator 13 required for winding are different due to inconsistent thicknesses of the first electrode plate 11 and the second electrode plate 12. Therefore, the thickness of the first electrode plate 11, the second electrode plate 12 and/or the separator 13 is detected by means of the detection unit 10, the length of the separator 13 is calculated, and the position of the feed roller 81 of the feeding unit 8 is then adjusted by means of control unit 9, so that the length of the separator on the feeding unit 8 is the predetermined length, thereby ensuring the precision of the film attaching position on the separator 13.

In some other embodiments, the first electrode plate 11 and the second electrode plate 12 are provided with tabs by die cutting. When the winding mechanism 2 winds to form the cell 1, the tabs on electrode plates need to be aligned with each other. During winding, the tabs may be misaligned. In order to reduce the misalignment between the tabs, when the first electrode plate 11 and the second electrode plate 12 are delivered, it is necessary to adjust the delivery lengths of the first electrode plate 11 and the second electrode plate 12 according to the positions of the tabs.

As the length of the electrode plate changes, the length of the separator 13 also needs to be adjusted. The positions of the tabs are detected by means of the detection unit 10, the delivery lengths of the first electrode plate 11 and the second electrode plate 12 are adjusted, and the position of the feed roller 81 of the feeding unit 8 is then adjusted by means of control unit 9 according to the delivery lengths of the first electrode plate 11 and the second electrode plate 12, so that the length of the separator on the feeding unit 8 is the predetermined length, thereby ensuring the precision of the film attaching position on the separator 13.

Figure 9:
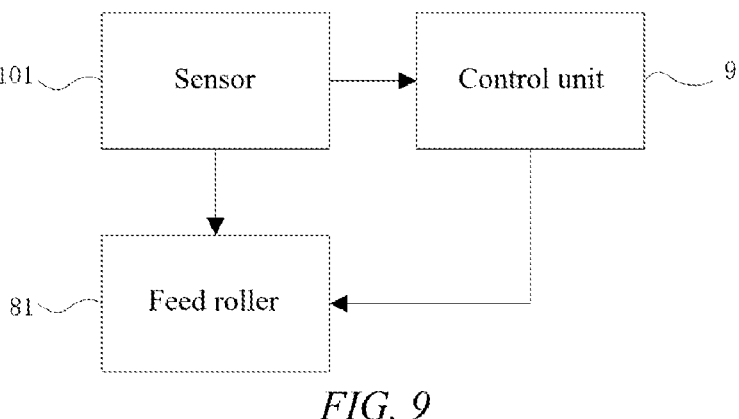
FIG. 9 is a functional block diagram of detecting feed rollers by means of a sensor according to a specific embodiment of the present application.

FIG. 9 is a functional block diagram of detecting feed rollers 81 by means of a sensor 101 according to a specific embodiment of the present application.

As shown in FIG. 9, in a specific embodiment, the detection unit 10 comprises a sensor 101, and the sensor 101 is connected to the feeding unit 8 and is configured to detects the positions of the plurality of feed rollers 81 and transmits a detection result to the control unit 9. The control unit 9 adjusts the length of the separator 13 delivered by means of the feeding unit 8 according to the detection result.

The sensor 101 detects the positions of the plurality of feed rollers 81. The control unit 9 calculates the length of the separator 13 on the feeding unit 8 according to the detection result. When the length of the separator 13 is greater or less than the predetermined length, it is determined that the length of separator 13 is too long or insufficient, and the position of the feed roller 81 is adjusted, thereby ensuring that the length of the separator 13 on the feeding unit 8 is equal to the predetermined length.

Figure 10:
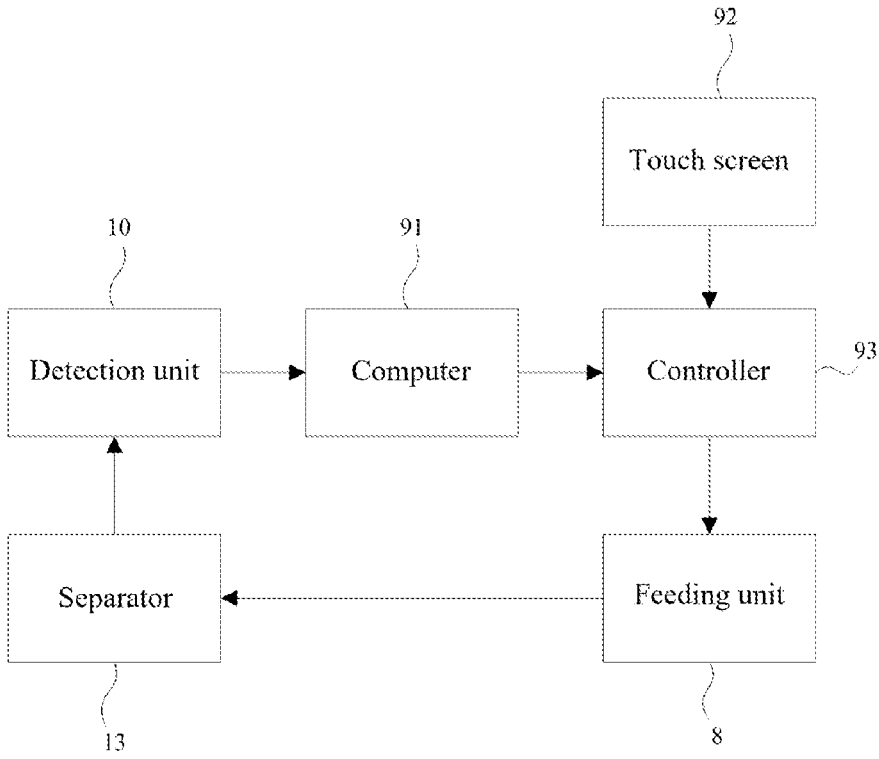
FIG. 10 is a functional block diagram of a control unit controlling a feeding unit to adjust a delivery length of a separator according to a specific embodiment of the present application.

FIG. 10 is a functional block diagram of a control unit 9 controlling a feeding unit 8 to adjust a delivery length of a separator 13 according to a specific embodiment of the present application.

As shown in FIG. 10, in a specific embodiment, the control unit 9 comprises a computer 91, a touch screen 92 and a controller 93.

In some embodiments, the detection unit 10 detects the material parameters of the separator 13, and transmits the material parameters to the computer 91 of the control unit 9, the computer 91 calculates the predetermined length of the separator 13 on the feeding unit 8 according to the material parameters, and a real-time result is displayed on the computer 91. The computer 91 transmits the calculation result to the controller 93. The controller 93 adjusts the position of the feed roller 81 according to the calculation result, so that the length of the separator 13 on the feeding unit is the predetermined length.

In some other embodiments, the detection unit 10 detects the positions of the plurality of feed rollers 81 and transmits position information of the feed rollers 81 to the computer 91 of the control unit 9, the computer 91 calculates the current length of the separator 13 on the feeding unit 8 according to the position information of the feed rollers 81, and a real-time result is displayed on the computer 91. The computer 91 transmits the calculation result to the controller 93. The controller 93 adjusts the position of the feed roller 81 according to the calculation result, so that the length of the separator 13 on the feeding unit 8 is the predetermined length.

An operator can also input a control instruction by means of the touch screen 92 to preset the predetermined length of the separator 13 on the feeding unit 8, and control the controller 93 to adjust the position of the feed roller 81, so that the separator 13 with a predetermined length can be conveyed by means of the feeding unit 8.

Figure 11:
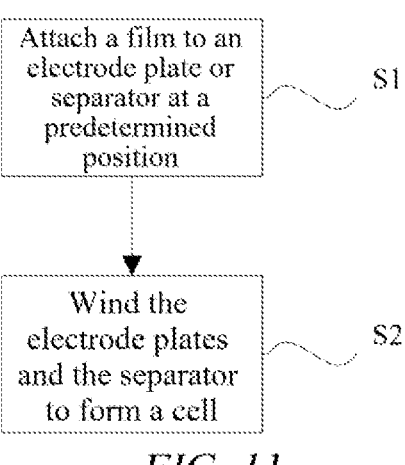
FIG. 11 is a flowchart of a cell manufacturing method according to an embodiment of the present application.

FIG. 11 is a flowchart of a cell manufacturing method according to an embodiment of the present application.

The present application also provides a method for manufacturing a cell 1, the cell 1 comprising a first electrode plate 11, a second electrode plate 12 and a separator 13. The method comprises the following steps.

At step S1, a film 14 is attached to the first electrode plate 11, second electrode plate 12 or separator 13 at a predetermined position, so as to form a reinforcing film layer on the first electrode plate 11, second electrode plate 12 or separator 13.

The film 14 can be attached to any one or more of the first electrode plate 11, the second electrode plate 12 and the separator 13.

At step S2, the first electrode plate 11, the second electrode plate 12 and the separator 13 are wound to form the cell 1.

In a specific embodiment, the cell manufacturing method further comprises the following steps: conveying the first electrode plate 11, the second electrode plate 12 and the separator 13 each with a predetermined length; attaching the film 14 to the first electrode plate 11, the second electrode plate 12 or the separator 13 at the predetermined position so as to form a plurality of reinforcing film layers spaced apart by a certain distance on the first electrode plate 11, the second electrode plate 12 or the separator 13 every time the delivery of the first electrode plate 11, the second electrode plate 12, and the separator 13 each with a predetermined length is finished.

A spacing between adjacent reinforcing film layers can be set according to the structure and stress conditions of the cell 1. For example, a section of the film 14 may be attached to the separator 13 at a predetermined position, so that a section of reinforcing film layer is formed in one cell 1. It is also possible to attach a section of the film 14 to the separator 13 at a plurality of predetermined positions, respectively, so that a plurality of sections of reinforcing film layers are formed in one cell 1.

In a specific embodiment, the cell manufacturing method further comprises the following steps: adjusting a conveying distance of the first electrode plate 11, second electrode plate 12 or separator 13 to deliver the first electrode plate 11, second electrode plate 12 or separator 13 with a predetermined length.

When the film 14 is attached to the separator 13, the length of the separator 13 from a film attaching position on the separator 13 to a winding position is fixed. The film 14 is attached to the separator 13 at the next predetermined position every time the delivery of the separator 13 with a predetermined length is finished. Thus, it is ensured that every film attaching position on the separator 13 is the predetermined position, and the precision of the film attaching position is then ensured.

In a specific embodiment of the cell manufacturing method, the adjusting a conveying distance of the first electrode plate 11, second electrode plate 12 or separator 13 to deliver the first electrode plate 11, second electrode plate 12 or separator 13 with a predetermined length comprises: detecting material parameters of the first electrode plate 11, second electrode plate 12 or separator 13, and adjusting the conveying distance of the first electrode plate 11, second electrode plate 12 or separator 13 according to the material parameters so as to deliver the first electrode plate 11, second electrode plate 12 or separator 13 with a predetermined length. A section of the film 14 is attached at the next predetermined position every time the delivery of the first electrode plate 11, second electrode plate 12 or separator 13 with a predetermined length is finished, so that it is ensured that every film attaching position is the predetermined position, and the precision of the film attaching position is then ensured. The material parameters include parameters such as the thickness of the first electrode plate 11, the second electrode plate 12 or the separator 13, and the positions of tabs of the first electrode plate 11 or the second electrode plate 12.

In some embodiments, when the first electrode plate 11, the second electrode plate 12 and the separator 13 are wound, the lengths of the first electrode plate 11, the second electrode plate 12 and the separator 13 required for winding are different due to inconsistent thicknesses of the first electrode plate 11 and the second electrode plate 12. Therefore, the thickness of the first electrode plate 11, the second electrode plate 12 and/or the separator 13 is detected, the length of the separator 13 is calculated, and the conveyed length of the separator 13 is then adjusted, so that the length of the separator is the predetermined length, thereby ensuring the precision of the film attaching position on the separator 13.

In some other embodiments, the first electrode plate 11 and the second electrode plate 12 are provided with tabs by die cutting. When winding to form the cell 1, the tabs on electrode plates need to be aligned with each other. During winding, the tabs may be misaligned. In order to reduce the misalignment between the tabs, when the first electrode plate 11 and the second electrode plate 12 are delivered, it is necessary to adjust the delivery lengths of the first electrode plate 11 and the second electrode plate 12 according to the positions of the tabs. As the length of the electrode plate changes, the length of the separator 13 also needs to be adjusted. The positions of the tabs are detected, the delivery lengths of the first electrode plate 11 and the second electrode plate 12 are adjusted, and the conveyed length of the separator 13 is then adjusted according to the delivery lengths of the first electrode plate 11 and the second electrode plate 12, so that the length of the separator is the predetermined length, thereby ensuring the precision of the film attaching position on the separator 13.

According to the cell manufacturing device 100 and method of the present application, during manufacture of the cell 1, the film 14 can be attached to the first electrode plate 11, second electrode plate 12 or separator 13 at the predetermined position while the first electrode plate 11, the second electrode plate 12 and the separator 13 are conveyed, thereby simplifying the process and improving the cell 1 winding efficiency. Moreover, during winding of the cell 1, the delivery length of the first electrode plate 11, second electrode plate 12 or separator 13 is adjusted to adjust the predetermined position where the film is attached, thereby improving the precision of the position of the reinforcing film layer.

A battery D provided by the present application comprises a cell manufactured by the cell manufacturing device 100 as described above. The reinforcing film layer is attached to at least one of the electrode plates or the separator of the cell at the predetermined position, so that the mechanical properties of the electrode plate and the separator are improved, and thus the service life of the battery is prolonged.

A power consuming apparatus provided by the present application, such as a vehicle A, uses a battery D to provide electric energy. A cell of the battery D is manufactured by the cell manufacturing device 100 as described above. The battery D has a long service life, and the service cycle of the battery D is prolonged, thereby saving the cost.

The foregoing descriptions are merely for some embodiments of the present application, but are not intended to limit the present application. For those skilled in the art, the present application may have various modifications and variations. Any modification, equivalent replacement, and improvement, etc., made without departing from the spirit and principle of the present application shall fall within the scope of the present application.

The invention claimed is:

1. A cell manufacturing device, configured to manufacture a cell comprising an electrode plate and a separator, the cell manufacturing device comprising:

a film attaching mechanism configured to attach a film to the separator at a predetermined position before the electrode plate and the separator are wound, so as to form a reinforcing film layer on the separator;

a winding mechanism configured to wind the electrode plate and the separator to form the cell;

a feeding unit provided between the film attaching mechanism and the winding mechanism, the feeding unit being configured to deliver the separator with a predetermined length, the predetermined length being equal to a length of the separator required for winding of one cell, so that the film attaching mechanism determines the predetermined position based on delivery of the separator with the predetermined length, wherein:

the feeding unit comprises a plurality of feed rollers, the plurality of feed rollers being provided at intervals, so that the separator with the predetermined length is delivered between the plurality of feed rollers; and a position of at least one of the plurality of feed rollers is adjustable to adjust a length of the separator delivered by the feeding unit;

a detection unit configured to detect a position of a tab of the electrode plate and a thickness of the electrode plate and the separator, and transmit the position of the tab of the electrode plate and the thickness of the electrode plate and the separator to a control unit; and the control unit configured to adjust the positions of the feed rollers according to the position of the tab of the electrode plate and a difference between the thickness of the electrode plate and the separator so as to adjust the length of the separator delivered by the feeding unit.

2. The cell manufacturing device according to claim 1, wherein:

the detection unit comprises a sensor connected to the feeding unit and configured to detect positions of the plurality of feed rollers and transmit a detection result to the control unit; and the control unit is configured to adjust the length of the separator delivered by the feeding unit according to the detection result.

3. The cell manufacturing device according to claim 1, wherein the film attaching mechanism comprises:

a film unwinding unit configured to convey the film;

a cutting unit configured to cut the film in response to the film with a predetermined length having been conveyed by the film unwinding unit; and an attaching unit configured to attach the film cut by the cutting unit to the separator at the predetermined position.

4. The cell manufacturing device according to claim 3, wherein the attaching unit comprises:

a film suction mechanism configured to suck the film cut by the cutting unit; and a pressing mechanism configured to press the film to the separator at the predetermined position.

5. The cell manufacturing device according to claim 4, wherein the pressing mechanism comprises a pressing roller or a pressing plate.

6. The cell manufacturing device according to claim 4, wherein the pressing mechanism is provided with a heating apparatus.

7. The cell manufacturing device according to claim 6, wherein the pressing mechanism comprises a pressing roller or a pressing plate.

8. The cell manufacturing device according to claim 1, further comprising:

an electrode plate delivery unit configured to deliver the electrode plate to the winding mechanism;

a separator delivery unit configured to deliver the separator to the winding mechanism;

an electrode plate unwinding unit configured to output the electrode plate to the electrode plate delivery unit; and a separator unwinding unit configured to output the separator to the separator delivery unit.

9. The cell manufacturing device according to claim 1, wherein the predetermined position is a position where the separator is bent during winding.

10. A method for manufacturing a cell comprising electrode plates and a separator, the method comprising:

detecting a position of a tab of the electrode plate and a thickness of the electrode plate and the separator, and adjusting a conveying distance of the separator according to the position of the tab of the electrode plate and a difference between the thickness of the electrode plate and the separator, to deliver the separator with the predetermined length, the predetermined length being equal to a length of the separator required for winding of one cell;

attaching a film to the separator at a predetermined position every time delivery of the electrode plate and the separator each with the predetermined length is finished, so as to form a reinforcing film layer on the separator; and winding the electrode plate and the separator to form the cell.

\* \* \* \* \*